(12) United States Patent
Kawabe

(10) Patent No.: US 6,218,765 B1
(45) Date of Patent: Apr. 17, 2001

(54) DRIVING DEVICE USING AN ELECTROMECHANICAL TRANSDUCER, AND AN APPARATUS HAVING THE DRIVING DEVICE

(75) Inventor: Koutaro Kawabe, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/318,915

(22) Filed: May 26, 1999

(30) Foreign Application Priority Data

May 27, 1998 (JP) .................................................. 10-145710

(51) Int. Cl.[7] ........................................................ H02N 2/06
(52) U.S. Cl. ................................................................ 310/317
(58) Field of Search ........................ 310/316.02, 316.03, 310/317

(56) References Cited

U.S. PATENT DOCUMENTS

| | | | |
|---|---|---|---|
| 5,225,941 | 7/1993 | Saito et al. ............................ | 359/824 |
| 5,355,047 | * 10/1994 | Okada ................................... | 310/316 |
| 5,907,212 | * 5/1999 | Okada ................................... | 310/328 |

FOREIGN PATENT DOCUMENTS

| | | | |
|---|---|---|---|
| 4-69070 | * 3/1992 | (JP) | ...................................... 310/317 |
| 4-165971 | * 6/1992 | (JP) | ...................................... 310/317 |
| 9-191676 | 7/1997 | (JP) | ................................. H02N/2/00 |

* cited by examiner

*Primary Examiner*—Thomas M. Dougherty
(74) *Attorney, Agent, or Firm*—Sidley & Austin

(57) ABSTRACT

Signals from a control device are supplied to terminals so as to adequately turn on/off five switches respectively configured by transistors FET1 to FET5, and two constant-current circuits I1 and I2, whereby a pulse voltage of a saw-tooth waveform is applied to a piezoelectric element A. The transistors FET2 and FET5 are turned on, so that the piezoelectric element A is charged gently, thereby preventing the generation of a sound at a start of a driving operation from occurring. Thereafter, the constant-current circuit I2 and the transistor FET3 are alternatingly turned on so that a slow discharge and a fast discharge of the piezoelectric element A are repeated. When the driving operation is to be stopped, the transistors FET2 and FET5 are turned off, and charges of the piezoelectric element A are dissipated through a closed circuit including resistors R1 and R2.

14 Claims, 12 Drawing Sheets

FIG. 1 (A) PRIOR ART
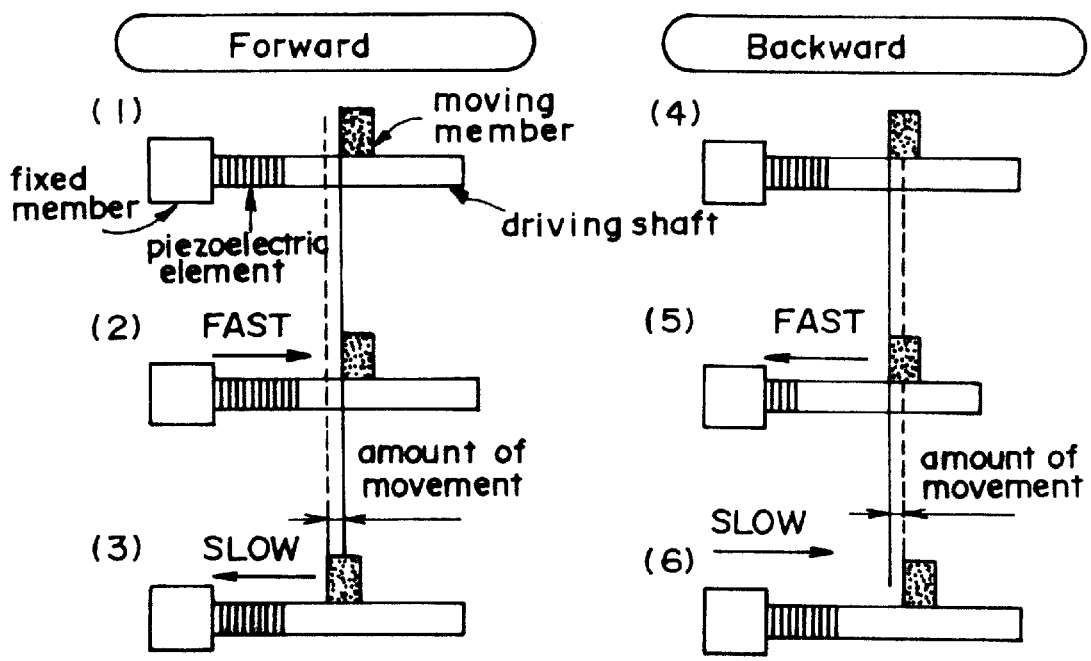
FIG. 1 (B) PRIOR ART
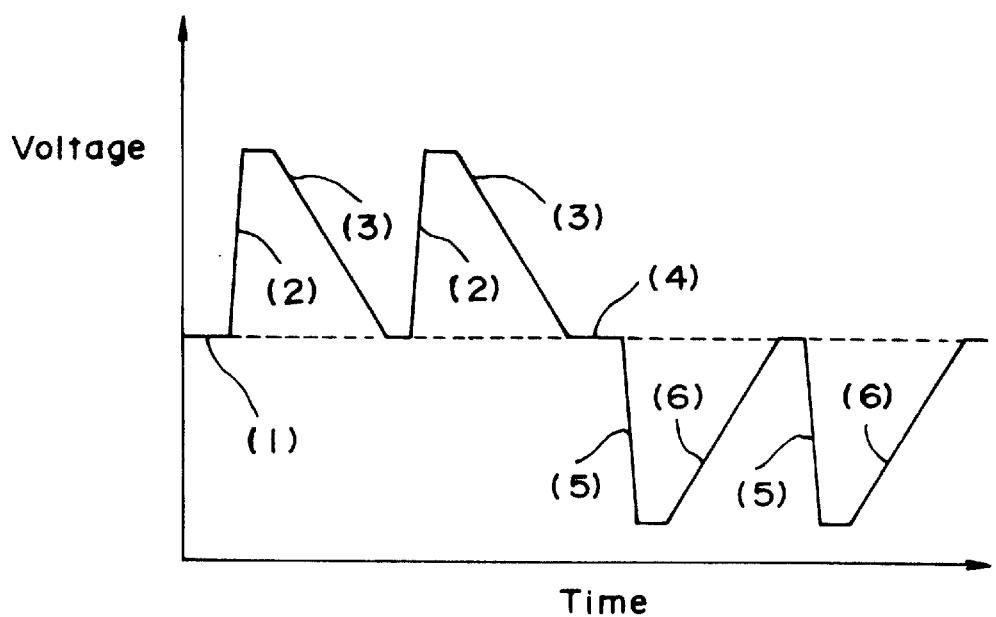

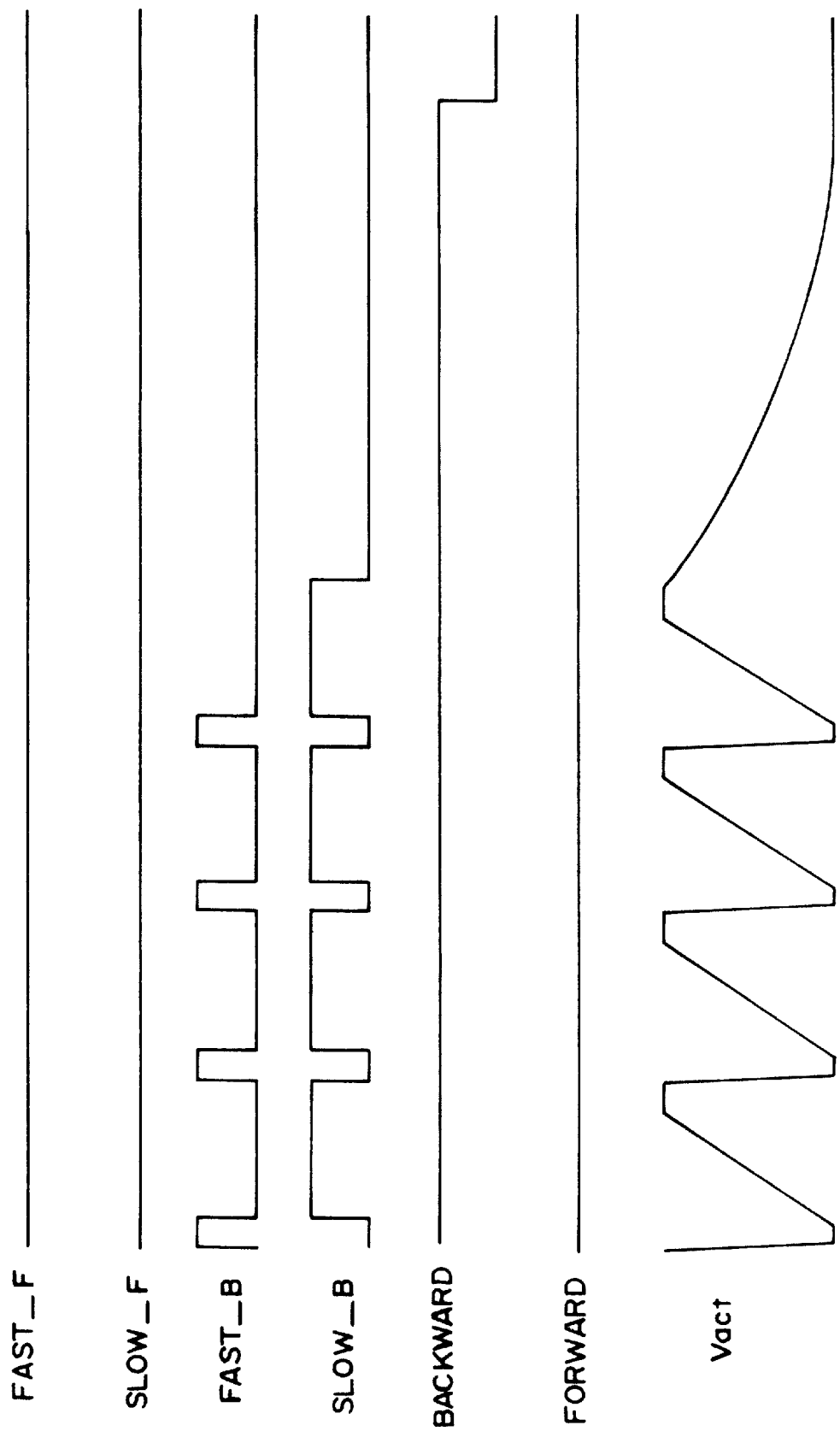

DRIVING DEVICE USING AN ELECTROMECHANICAL TRANSDUCER, AND AN APPARATUS HAVING THE DRIVING DEVICE

This application is based on application No. 10-145710 filed in Japan, the content of which is hereby incorporated by reference.

BACKGROUND OF THE INVENTION

1. Field of the Invention

The present invention relates to a driving device using an electromechanical transducing element, a driving circuit for the device, and an apparatus having the device and the circuit. Specifically, the invention relates to an apparatus such as an X-Y table, a camera, an overhead projector, or a binocular, a driving device for such an apparatus, and a driving circuit for the device.

2. Description of the Prior Art

Conventionally, an X-Y table, a taking lens of a camera, or the like is driven by a driving device using an electric motor. It has been pointed out that such a device is large in size and has disadvantages such as generation of a magnetic field and noises. Therefore, a driving device using an electromechanical transducing element has been proposed as a means which can solve such various problems.

As shown in a driving principle view of FIG. 1(A), for example, the device comprises: a fixed member B which is fixed to a base (not shown); a piezoelectric element A in which one end face in the expansion and contraction directions is secured to the fixed member B; a driving shaft S which is supported onto the base or the fixed member B so as to be movable in the expansion and contraction directions of the piezoelectric element A, and in which an axial end face is fixedly coupled to the other end face in the expansion and contraction directions of the piezoelectric element A; and a moving member M which is frictionally coupled to the driving shaft S. A pulse voltage of an approximately saw-tooth waveform such as that shown in FIG. 1(B) is applied to the piezoelectric element A, so that the piezoelectric element A expands or contracts fast in one direction and slow in the opposite direction, thereby causing the driving shaft S to be moved fast in the one direction and slow in the opposite direction. As a result, the moving member M is driven along the driving shaft S.

Specifically, when the voltage applied to the piezoelectric element A is suddenly raised from a reference voltage indicated by (1) in FIG. 1(B) to a maximum voltage as indicated by (2), the piezoelectric element A expands from the reference state shown in (1) of FIG. 1(A) abruptly or fast as shown in (2), and the driving shaft S is moved fast in the direction along which the shaft is separated from the fixed member B. At this time, the acceleration of the driving shaft S is so high that the inertia force of the moving member M is larger than the friction force exerted between the moving member M and the driving shaft S, and hence the driving shaft S is moved while the moving member M is not substantially moved.

When the voltage applied to the piezoelectric element A is thereafter lowered slow from the maximum voltage to the reference voltage as indicated by (3) in FIG. 1(B), also the driving shaft S is moved slow in accordance with the lowering as shown in (3) of FIG. 1(A). At this time, the acceleration of the driving shaft S is so low that the inertia force acting on the moving member M is small. Therefore, the friction force exerted between the moving member M and the driving shaft S causes the moving member M to be moved slow integrally with the driving shaft S.

When such a pulse voltage of an approximately saw-tooth waveform is continuously applied to the piezoelectric element A, the moving member M is moved in the forward direction. In the following, description will be made assuming that the left portion of each figure is in the front side and the right portion is in the rear side.

When the moving member is to be moved in the backward direction, a pulse voltage which is opposite in polarity to that in the case of the forward direction is applied to the piezoelectric element A so as to invert the relationships between the expansion and contraction directions of the piezoelectric element A and the fast and slow movements. As shown in (4) to (6) of FIGS. 1(A) and 1(B), for example, the pulse voltage has an approximately saw-tooth waveform which abruptly falls from the reference voltage to the minimum voltage and then rises slow from the minimum voltage to the reference voltage.

In order to apply a pulse voltage of such a waveform to the piezoelectric element A, a driving circuit shown in FIG. 2 is used. The driving circuit generally comprises: four switches respectively configured by transistors FET1 to FET4; two constant-current circuits I1 and I2; and six terminals to which a high-level signal (hereinafter, referred to as "H signal") or a low-level signal (hereinafter, referred to as "L signal") is adequately supplied from a controller (not shown). A pulse voltage of a saw-tooth waveform is applied across terminals P1 and P2 of the piezoelectric element A.

As shown in a timing chart of FIG. 3, when the driving operation is to be conducted in the forward direction, for example, the H signal is supplied to FORWARD terminal to turn on the transistor FET2, thereby setting one terminal P1 of the piezoelectric element A to the ground level. Next, the H signal is supplied to FAST_F terminal to turn on the transistor FET3, so that a voltage $V_{HV}$ of HV terminal is applied to the other terminal P2 of the piezoelectric element A. At this time, the driving voltage Vact which is seen from the one terminal P1 of the piezoelectric element A toward the other terminal P2 rises suddenly from the ground level to the voltage $V_{HV}$, and the piezoelectric element A is rapidly charged so as to fast extend. The L signal is then supplied to FAST_F terminal to turn off the transistor FET3, and the H signal is thereafter supplied to SLOW_F terminal to turn on the constant-current circuit I2, so that charges are removed slow through the other terminal P2 of the piezoelectric element A. As a result, the driving voltage Vact of the piezoelectric element A falls slow and the piezoelectric element contracts slow. Thereafter, the H signal is alternatingly supplied to FAST_F and SLOW_F terminals, with the result that the driving voltage Vact of the piezoelectric element A has a waveform which reciprocates in an approximately saw-tooth like manner between $V_{HV}$ and an intermediate level $V_T$ which lies between $V_{HV}$ and the ground level. Namely, the waveform of the driving voltage Vact rises abruptly when the H signal is supplied to FAST_F terminal, and falls slow when the H signal is supplied to SLOW_F terminal. When the driving operation is to be stopped, the L signal is supplied to FORWARD terminal.

When the driving operation is to be conducted in the backward direction, similarly, the H signal is supplied to BACKWARD terminal to turn on the transistor FET4, thereby setting the other terminal P2 of the piezoelectric element to the ground level. Next, the H signal is supplied to FAST_B terminal to turn on the transistor FET1, so that the voltage $V_{HV}$ of HV terminal is applied to the one terminal P1 of the piezoelectric element A. At this time, the driving voltage Vact of the piezoelectric element A falls suddenly from the ground level to $-V_{HV}$, and the piezoelectric element A is rapidly charged so as to contract fast. The L signal is then supplied to FAST_B terminal, and the H signal is thereafter supplied to SLOW_B terminal to turn on the constant-current circuit I1, so that charges are removed slow through the one terminal P1 of the piezoelectric element A. As a result, the driving voltage Vact rises gently and the piezoelectric element extends slow. Thereafter, the H signal is alternatingly supplied to FAST_B and SLOW_B terminals, with the result that the driving voltage Vact of the piezoelectric element A has a waveform which reciprocates in an approximately saw-tooth like manner between $-V_{HV}$ and an intermediate level $-V_T$ which lies between $-V_{HV}$ and the ground level.

In the driving circuit, when the H signal is supplied at the first time to FAST_F terminal after the H signal is supplied to FORWARD terminal, i.e., immediately after the start of the driving operation, the piezoelectric element A is rapidly charged so as to suddenly start to deform from the still state. At this time, abrupt vibration occurs in the piezoelectric element A to generate a sound or noise. Even after the driving operation is ended, charges remain to exist in the piezoelectric element A. In the case where the driving operation is thereafter conducted in the opposite direction, therefore, the polarity of the piezoelectric element A is suddenly inverted. Consequently, a large potential difference is abruptly produced in the piezoelectric element A, so that a sound is generated also in this case. The piezoelectric element A may be sometimes destroyed depending on the potential difference.

By contrast, even in the case where the piezoelectric element A is charged slow and then discharged fast, when the driving operation is conducted with the opposite polarity after the driving operation is stopped under a state where the piezoelectric element A is charged, a sound is generated because of the following reason. Even if the driving operation is started while charging slow the piezoelectric element A in an initial state, the potential of the element is abruptly changed.

In order to reduce the level of such a sound, a method in which a piezoelectric element is gradually charged or discharged by using a drive pulse generating circuit has been proposed. As shown in FIG. 4, when application of a pulse voltage to the piezoelectric element A is stopped, for example, the bias voltage $V_{HV}$ may sometimes remain in the piezoelectric element A. As shown in FIG. 4, therefore, short pulses of the H signal are supplied to SLOW_F terminal after the driving operation is stopped, so as to intermittently operate the constant-current circuit I2. As a result, a small amount of charges corresponding to the on time of the constant-current circuit I2 are removed away from the piezoelectric element A. When this operation is repeated, the piezoelectric element A is totally discharged. According to this configuration, the generation of a sound can be prevented from occurring, without adding extra components.

In the method, the bias voltage $V_{HV}$ is discharged by using the constant-current circuit I2, and hence the pulse signal must remain to be supplied to the circuit even before the driving operation of the moving member M is started or after the driving operation is stopped, thereby producing a disadvantage that the burden of a microcomputer is large and the control is complicated.

SUMMARY OF THE INVENTION

Therefore, it is an object of the invention to provide a driving device in which the generation of a sound or noise at a start of a driving operation can be prevented from occurring, without requiring a complicated control, a driving circuit for the device, and an apparatus having the device and the circuit.

In order to attain the object, one aspect of the invention has the following configuration.

The driving device or an apparatus having the driving device comprises an electromechanical transducing element, and a drive pulse generator which supplies and removes charges to and from the electromechanical transducing element. An expansion and contraction displacement in which the rate of expansion is different from that of contraction is caused in the electromechanical transducing element by drive pulses which are output from the drive pulse generator, whereby a driven portion is moved in a predetermined direction. The driving device further comprises a charger which operates before the drive pulse generator operates, to supply charges to the electromechanical transducing element through a route other than a route for the drive pulse generator.

In the configuration, for example, the drive pulse generator supplies to the electromechanical transducing element, pulses of an approximately saw-tooth waveform comprising steep rising portions (or falling portions) and gentle falling portions (or rising portions). When the pulses are supplied to the electromechanical transducing element, the element performs fast one of expansion and contraction, and performs slow the other of expansion and contraction, whereby the driven portion is moved in the predetermined direction.

In the configuration, in the driving operation of the driving device, the charger first operates. At this time, charges can be supplied in such a manner that the electromechanical transducing element is not abruptly changed or a sound is not generated. Since the charger supplies charges to the electromechanical transducing element through a route other than that for the drive pulse generator, charges can be supplied to the element even when the drive pulse generator is not operating. Thereafter, the drive pulse generator operates so as to supply to or remove charges from the electromechanical transducing element, and repeats this process.

Therefore, the generation of a sound at a start of the driving operation can be prevented from occurring, without requiring a complicated control.

In an embodiment, a rate of supplying charges by the charger to the electromechanical transducing element is lower than a rate of supplying charges by the drive pulse generator to the element.

According to this configuration, even in the case where a sound is generated when the drive pulse generator supplies charges to the electromechanical transducing element to start the driving operation, the generation of a sound can be prevented from occurring, by supplying charges at a low rate by the charger so as to cause the driving operation to start slow.

Another aspect of the invention comprises a discharger which operates after the operation of the drive pulse generator is ended, to remove charges from the electromechanical transducing element through a route other than a route for the drive pulse generator.

In the configuration, when the driving operation of the driving device is to be stopped, the discharger lastly operates. At this time, charges can be removed away in such a manner that the electromechanical transducing element is not abruptly changed. Since the discharger removes away charges from the electromechanical transducing element through a route other than that for the drive pulse generator, charges can be removed away from the element even when the drive pulse generator is not operating. At the timing when the driving operation is again started, the electromechanical transducing element is already in a discharged state, and the element is first charged. When the drive pulse generator is configured so as to conduct the charging process at this time while generating no sound, therefore, the generation of a sound at a start of the driving operation can be prevented from occurring.

Therefore, the generation of a sound at a start of the driving operation can be prevented from occurring, without requiring a complicated control.

In an embodiment, a rate of removing charges by the discharger from the electromechanical transducing element is lower than a rate of removing charges by the drive pulse generator from the element.

According to this configuration, even in the case where a sound is generated when the drive pulse generator removes charges from the electromechanical transducing element to start the driving operation, the driving operation is always started from a charging process and hence the generation of a sound can be prevented from occurring.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numerals throughout the several drawings.

FIGS. 1(A) and 1(B) are diagrams illustrating an operation of a driving device of the prior art;

FIG. 12 is a timing chart of the driving circuit of FIG. 7.

DETAILED DESCRIPTION OF THE PREFERRED EMBODIMENTS

Figure 5:
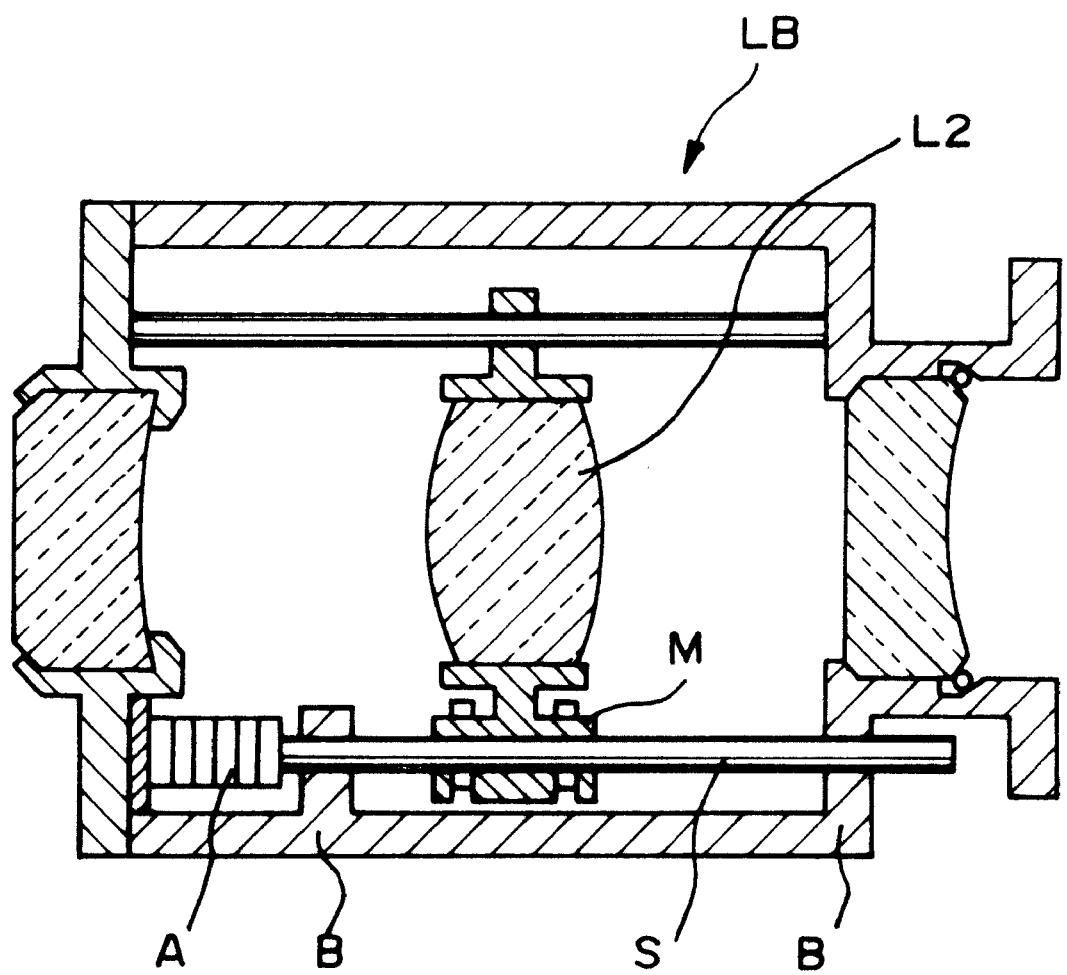
FIG. 5 shows a mechanism which is commonly used in embodiments of the invention.

First, a configuration which is commonly used in the following embodiments will be described with reference to FIG. 5. In FIG. 5, components corresponding to those of FIG. 1(A) are designated by the same reference numerals.

FIG. 5 shows an interchangeable lens LB of a camera having three lens units. A second lens unit L2 is disposed so as to be movable in the optical axis. The second lens unit L2 is held in a lens holder M which is frictionally coupled to the driving shaft S.

The driving shaft S is held by an opening formed in a stationary barrel B of the interchangeable lens LB. One end of the shaft is bonded to the piezoelectric element A. The face of the piezoelectric element A which is opposite to that bonded to the driving shaft S is bonded to the stationary barrel B. When charges are supplied, the piezoelectric element A expands in the direction of the driving shaft S, so that the driving shaft S is driven toward the right portion of the figure. When the piezoelectric element A is discharged, the element contracts, so that the driving shaft S is driven toward the left portion of the figure. When the supply and removal of charges to and from the piezoelectric element A are repeated by means of a waveform having different slopes, the lens holder M and the second lens unit L2 are moved in the leftward or rightward direction in the figure.

The shape of the device is not restricted to that shown in FIG. 5 and various shapes such as those disclosed in U.S. Pat. Nos. 5,589,723, 5,587,846, and 5,786,654 may be employed.

Figure 6:
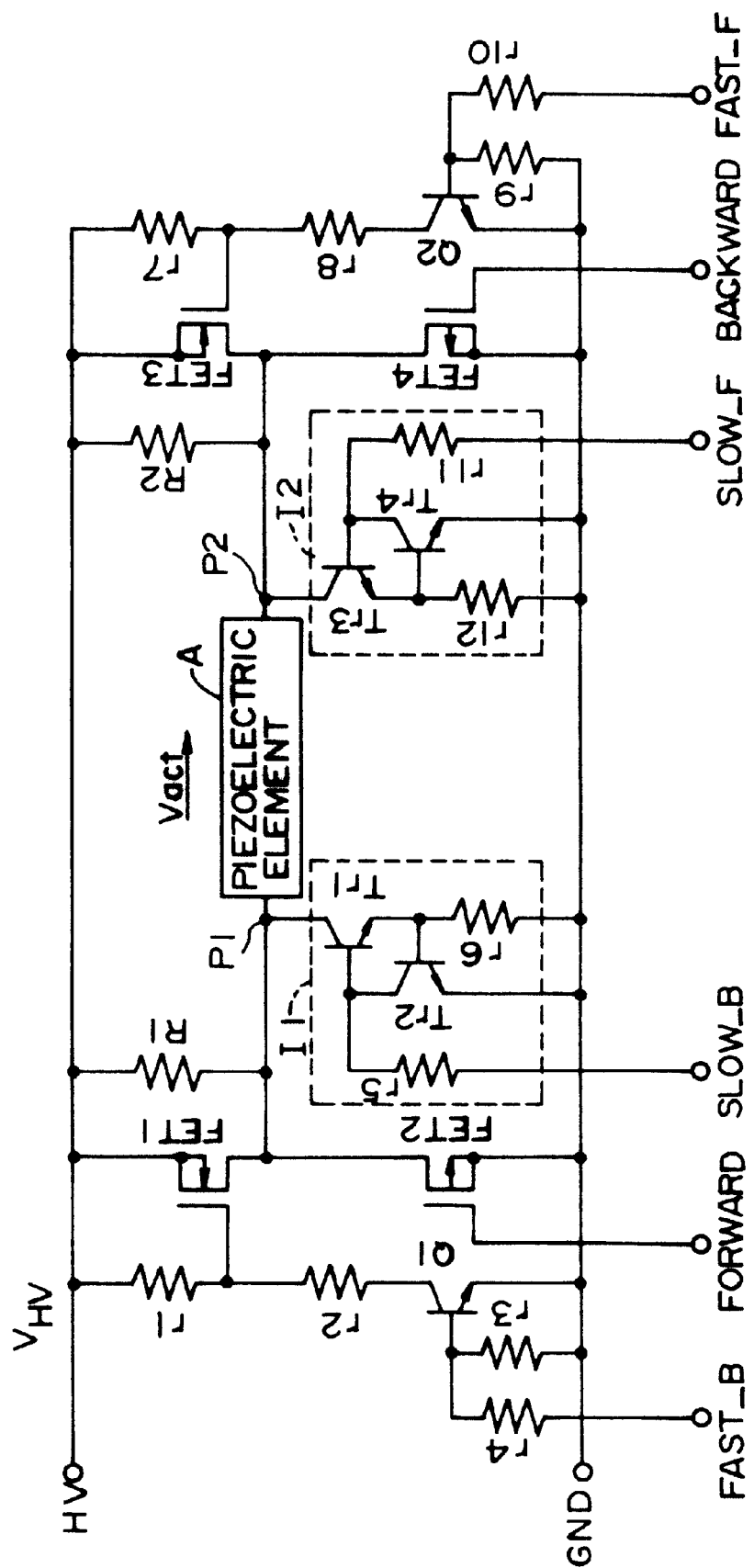
FIG. 6 is a circuit diagram of a driving circuit of a first embodiment of the invention.

Next, a first embodiment shown in FIG. 6 will be described.

Figure 2:
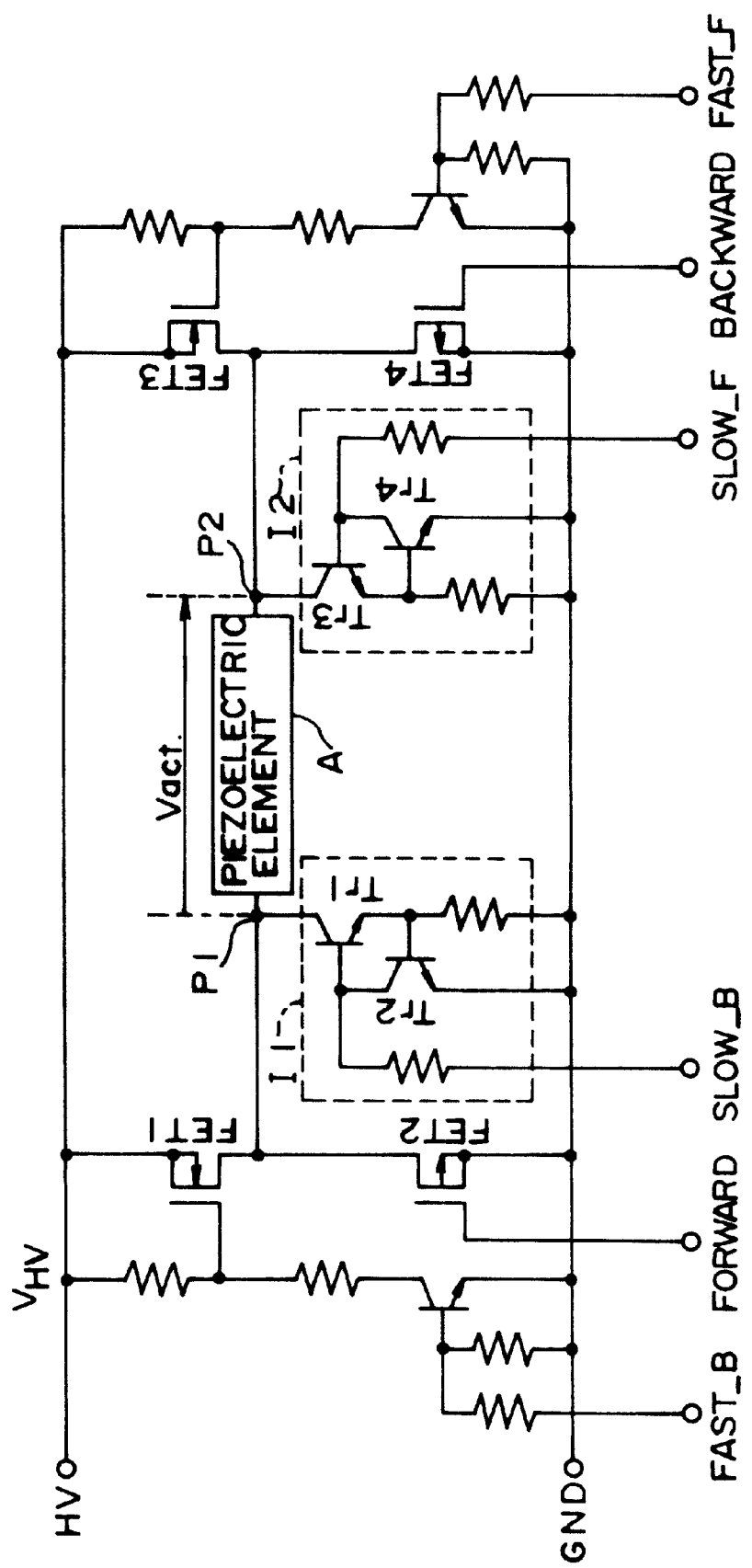
FIG. 2 is a circuit diagram of the driving device of the prior art.
Figure 3:
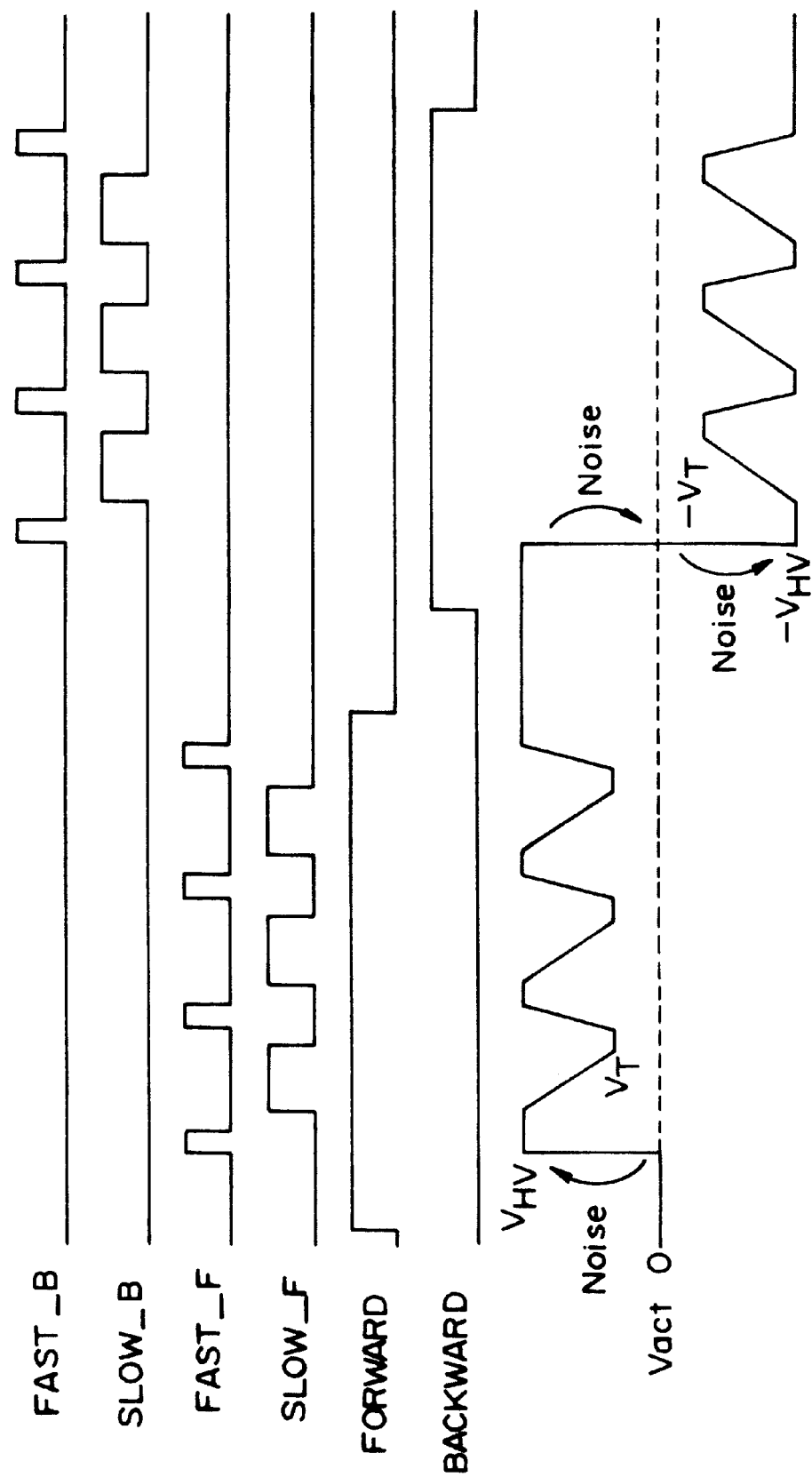
FIG. 3 is a timing chart of an operation of the circuit of FIG. 2.
Figure 4:
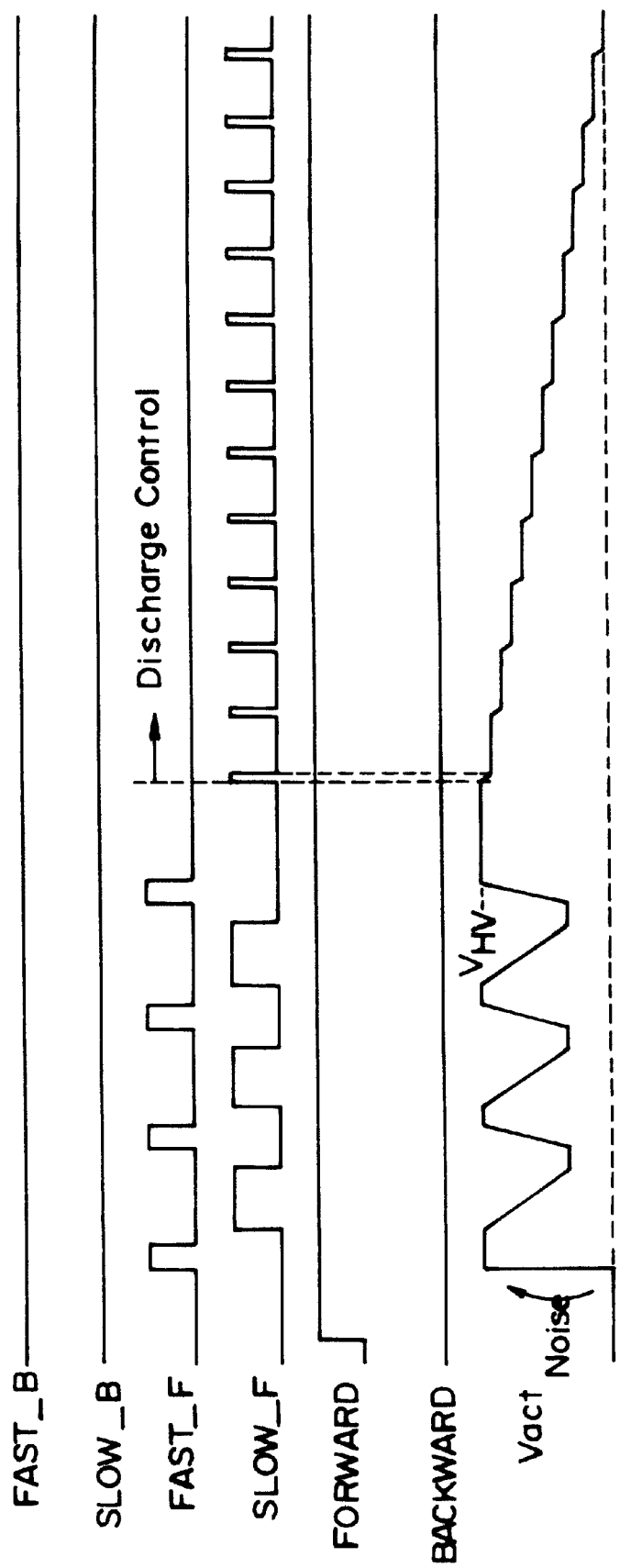
FIG. 4 is a timing chart of another operation of the driving device of the prior art.

A driving circuit of the first embodiment is an improvement of the circuit of the prior art shown in FIG. 2, and therefore will be described with reference to FIG. 2 also.

One terminal of a resistor r1 is connected to HV terminal. The other terminal of the resistor r1 is connected to one terminal of a resistor r2. The collector of a transistor Q1 is connected to the other end of the resistor r2. The emitter of the transistor Q1 is connected to the ground terminal GND. The base of the transistor Q1 is connected to the ground terminal GND via a resistor r3, and also to FAST_B terminal via a resistor r4.

The drain of the transistor FET1 is connected to HV terminal. The source of the transistor FET1 is connected to that of the transistor FET2. The gate of the transistor FET1 is connected to the junction of the resistors r1 and r2. The drain of the transistor FET2 is connected to the ground terminal GND. FORWARD terminal is connected to the gate of the transistor FET2. The junction of the sources of the transistors FET1 and FET2 is connected to the one terminal P1 of the piezoelectric element A.

The constant-current circuit I1 which is turned on/off in accordance with the state of SLOW_B terminal is connected to the one terminal P1 of the piezoelectric element A. Specifically, the collector of a transistor Tr1 is connected to the one terminal P1 of the piezoelectric element A. The emitter of the transistor Tr1 is connected to the ground terminal GND via a resistor r6. The base of the transistor Tr1 is connected to the collector of a transistor Tr2. In the transistor Tr2, the emitter is connected to the ground terminal GND, and the base is connected to the junction of the emitter of the transistor Tr1 and the resistor r6. The base of the transistor Tr1 is connected also to SLOW_B terminal via a resistor r5.

The portion on the side of the other terminal of the piezoelectric element A is configured in a similar manner by resistors r7 to r12, transistors Tr3, Tr4, Q3, Q4, FET3, and FET4, and SLOW_F, BACKWARD, and FAST_F terminals.

Resistors R1 and R2 are connected between HV terminal and the terminals P1 and P2 of the piezoelectric element A, respectively.

When the H signal is supplied to FORWARD or BACKWARD terminal to turn on the transistor FET2 or FET4, the piezoelectric element A is charged via the resistor R1 or R2. This will be described later in detail. The charging rate in this case depends on the electrostatic capacity of the piezoelectric element A and the value of the resistor R1 or R2. Therefore, the resistors R1 and R2 are set so as to have a sufficiently large value. At the timing when the piezoelectric element A is biased, the H signal is supplied for a short time in pulse-like manner to FAST_F or FAST_B terminal to turn on the transistor FET3 or FET1, thereby driving the driving device.

Figure 11:
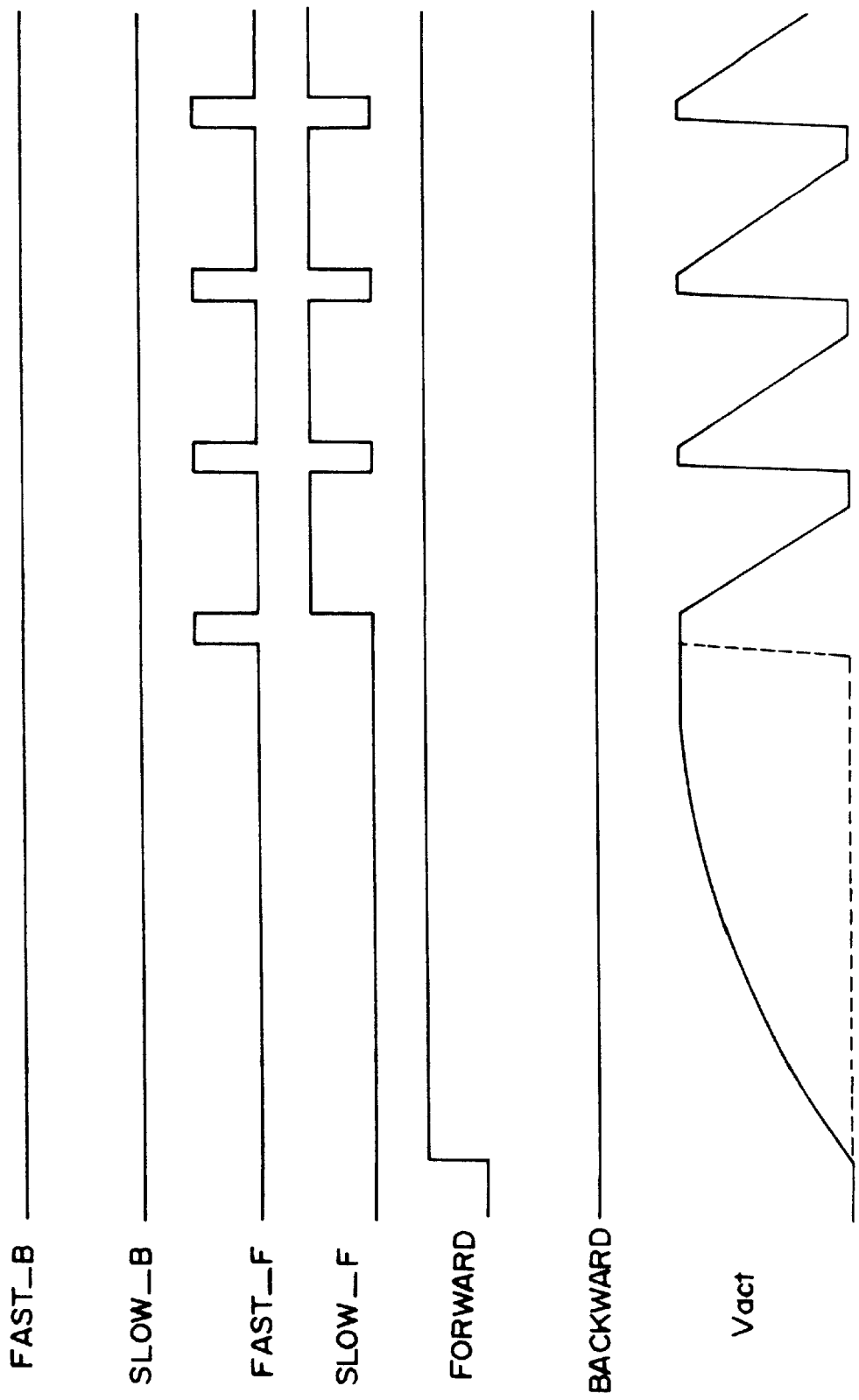
FIG. 11 is a timing chart of the driving circuit of FIG. 6.

Next, the operation of the driving circuit will be described. The driving circuit operates in the same manner in both the cases of the forward and backward directions. In the following, therefore, the operation in the case of the forward direction will be described with reference to the timing chart of FIG. 11.

First, the H signal is supplied to FORWARD terminal. At this time, the transistor FET2 is turned on and hence the resistor R1 becomes meaningless. The piezoelectric element A is charged through the route of HV terminal, the resistor R2, the piezoelectric element A, the transistor FET2, and the ground terminal GND. As a result, the voltage Vact of the other terminal P2 of the piezoelectric element A rises gently.

The H signal is then supplied to FAST_F terminal to turn on the transistor FET3. At this time, the voltage Vact of the other terminal P2 of the piezoelectric element A is substantially unchanged. If the above-described countermeasure using the resistor R2 is not taken, the voltage of the other terminal P2 of the piezoelectric element A rises suddenly to the voltage $V_{HV}$ as indicated by the broken line in FIG. 11 and a sound is generated. By contrast, the employment of the above-described countermeasure can prevent the generation of a sound from occurring.

Next, the L signal is supplied to FAST_F terminal, and the H signal is then supplied to SLOW_F terminal to turn on the constant-current circuit I2. As a result, charges of the piezoelectric element A are removed slow, so that the voltage of the other terminal P2 of the piezoelectric element A falls gently. At this time, the resistor R2 is pulled up. However, the impedance of the constant-current circuit I2 is sufficiently lower than that of the resistor R2. Therefore, no influence is exerted by the resistor.

Thereafter, the L signal is supplied to SLOW_F terminal to turn off the constant-current circuit I2, and the H signal is then supplied to FAST_F terminal to turn on the transistor FET3. Also in this case, the impedance of the route including the transistor FET3 is sufficiently lower than that of the resistor R2, and hence the voltage of the other terminal P2 of the piezoelectric element A rises suddenly to the voltage $V_{HV}$.

Thereafter, the H signal is alternatingly supplied to SLOW_F and FAST_F terminals, whereby the lens holder M and the second lens unit L2 are moved in the forward direction or the leftward direction in FIG. 5.

As described above, the piezoelectric element A is first gently charged through the first route including the resistor R1 or R2, and thereafter rapidly charged through the second route including the transistor FET1 or FET3. The resistor R1 or R2 functions only during the application of the bias voltage, so that only the initial rise or fall of the driving voltage Vact of the piezoelectric element is moderated. Therefore, the generation of a sound during the driving operation can be prevented from occurring.

Figure 7:
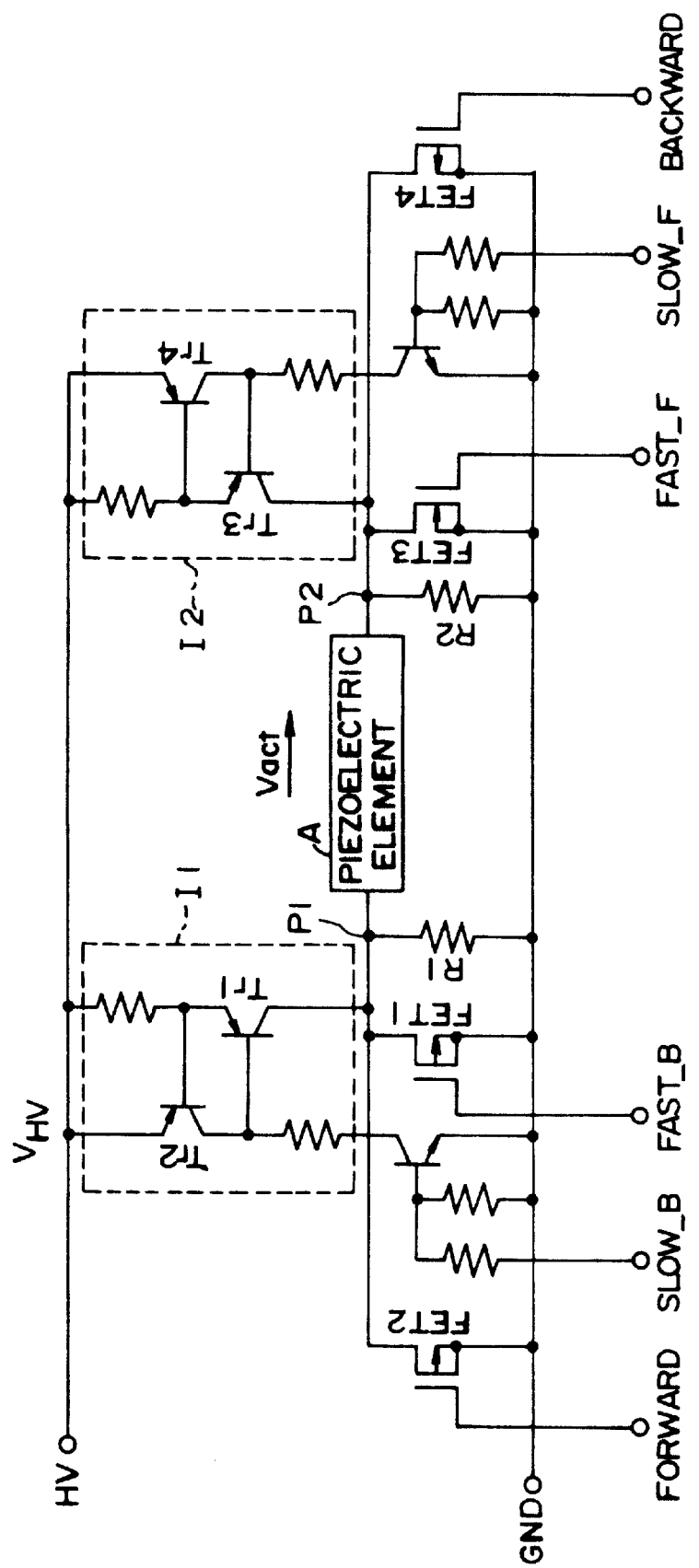
FIG. 7 is a circuit diagram of a driving circuit of a second embodiment of the invention.

Next, a second embodiment will be described with reference to the circuit diagram of FIG. 7.

In the first embodiment, the two or slow and fast routes are disposed on the charging side of the piezoelectric element A. In the second embodiment, two or slow and fast routes are disposed on the discharging side of the piezoelectric element A. As shown in FIG. 7, the constant-current circuit I1 is connected between HV terminal and the one terminal P1 of the piezoelectric element A, and the constant-current circuit I2 is connected between HV terminal and the other terminal P2 of the piezoelectric element A. The constant-current circuit I1 or I2 is configured so that, when the H/L signal is supplied to SLOW_B or SLOW_F terminal, the transistor Tr1 or Tr3 is turned on/off. The terminals P1 and P2 of the piezoelectric element A are connected to the ground terminal GND via the resistors R1 and R2, respectively. The terminal P1 of the piezoelectric element A is connected to FAST_B terminal via the transistor FET1, and also to FORWARD terminal via the transistor FET2. The terminal P2 of the piezoelectric element A is connected to FAST_F terminal via the transistor FET3, and also to BACKWARD terminal via the transistor FET4.

Next, the operation of the driving circuit will be described.

The operation in the case of the backward direction will be described. In this case, the operation is conducted as shown in the timing chart of FIG. 12. First, the H signal is supplied to BACKWARD terminal. As a result, the transistor FET4 is turned on, and hence the resistor R2 becomes meaningless.

The H signal is then supplied to SLOW_B terminal to turn on the constant-current circuit I1. As a result, the side of the one terminal P1 of the piezoelectric element A is charged and the driving voltage Vact of the piezoelectric element A rises gently.

Next, the L signal is supplied to SLOW_B terminal to turn off the constant-current circuit I1.

The H signal is then supplied to FAST_B terminal to turn on the transistor FET1, so that the driving voltage Vact falls steeply. Thereafter, the H signal is alternatingly supplied to SLOW_B and FAST_B terminals, thereby causing the driving voltage Vact of the piezoelectric element A to alternatingly repeat a gentle rise and a steep fall. As a result, the lens holder M and the second lens unit L2 are moved in the backward direction or the rightward direction in FIG. 5.

When the driving operation is to be stopped, the H signal is supplied to SLOW_B terminal so that the side of the one terminal P1 of the piezoelectric element A is charged, and the L signal is then supplied to SLOW_B terminal. After elapse of a predetermined period, the L signal is supplied to BACKWARD terminal. In this case, the L signal remains to be supplied to FAST_B terminal to which, when the driving operation must be continued, the H signal is to be supplied, and charges on the side of the one terminal P1 of the piezoelectric element A is removed slow via the resistor R1. As a result, the driving voltage Vact gently falls gently and finally reaches the ground level.

In the case of the forward direction, similarly, the H signal is supplied to FORWARD terminal. Thereafter, the H signal is alternatingly supplied to SLOW_F and FAST_F terminals.

As described above, as a result of the control of stopping the driving operation, charges of the piezoelectric element A are gently removed via the resistor R1 or R2. When the driving operation is to be conducted next time, therefore, the driving operation is always started with the charging process. The charging process is gently conducted by the constant-current circuits I1 and I2. In the start of the driving operation, the initial rise or fall of the driving voltage Vact of the piezoelectric element is gentle. Consequently, the generation of a sound during the driving operation can be prevented from occurring.

Figure 9:
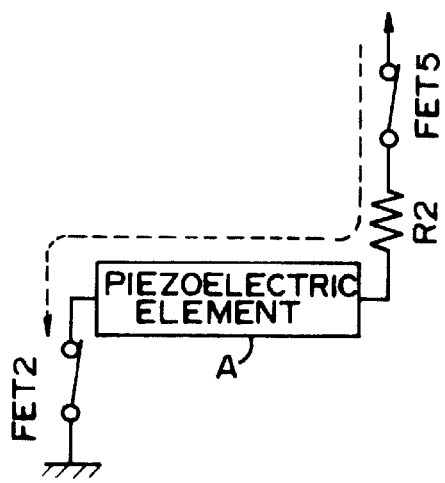
FIGS. 9(A) to 9(D) are diagrams illustrating an operation of the driving circuit of FIG. 8.
Figure 9:
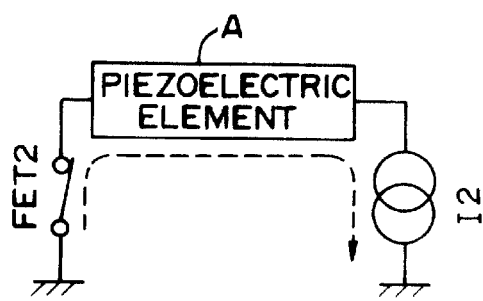
Figure 9:
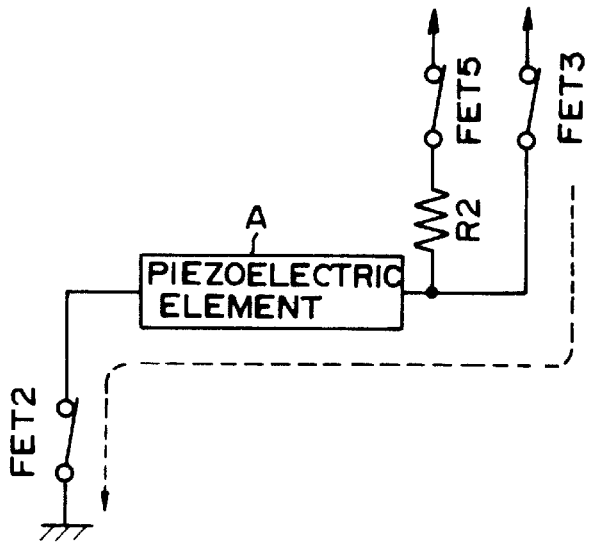
Figure 9:
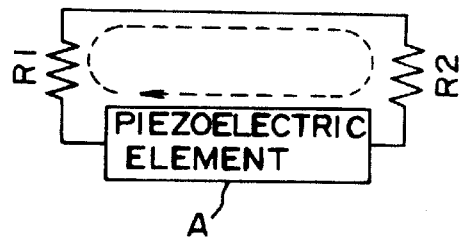
Figure 10:
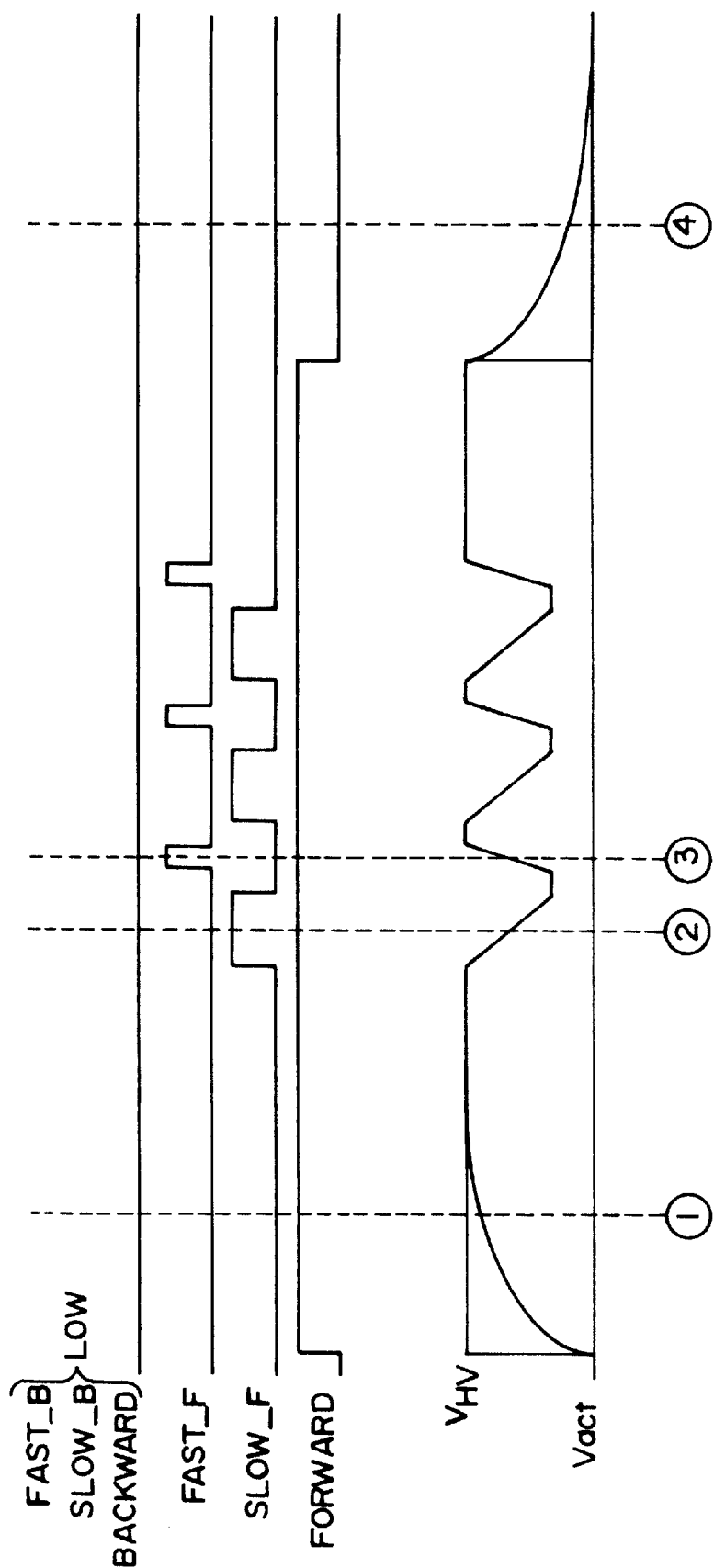
FIG. 10 is a timing chart of the driving circuit of FIG. 8.

Next, a third embodiment will be described with reference to FIGS. 8 to 10.

Figure 8:
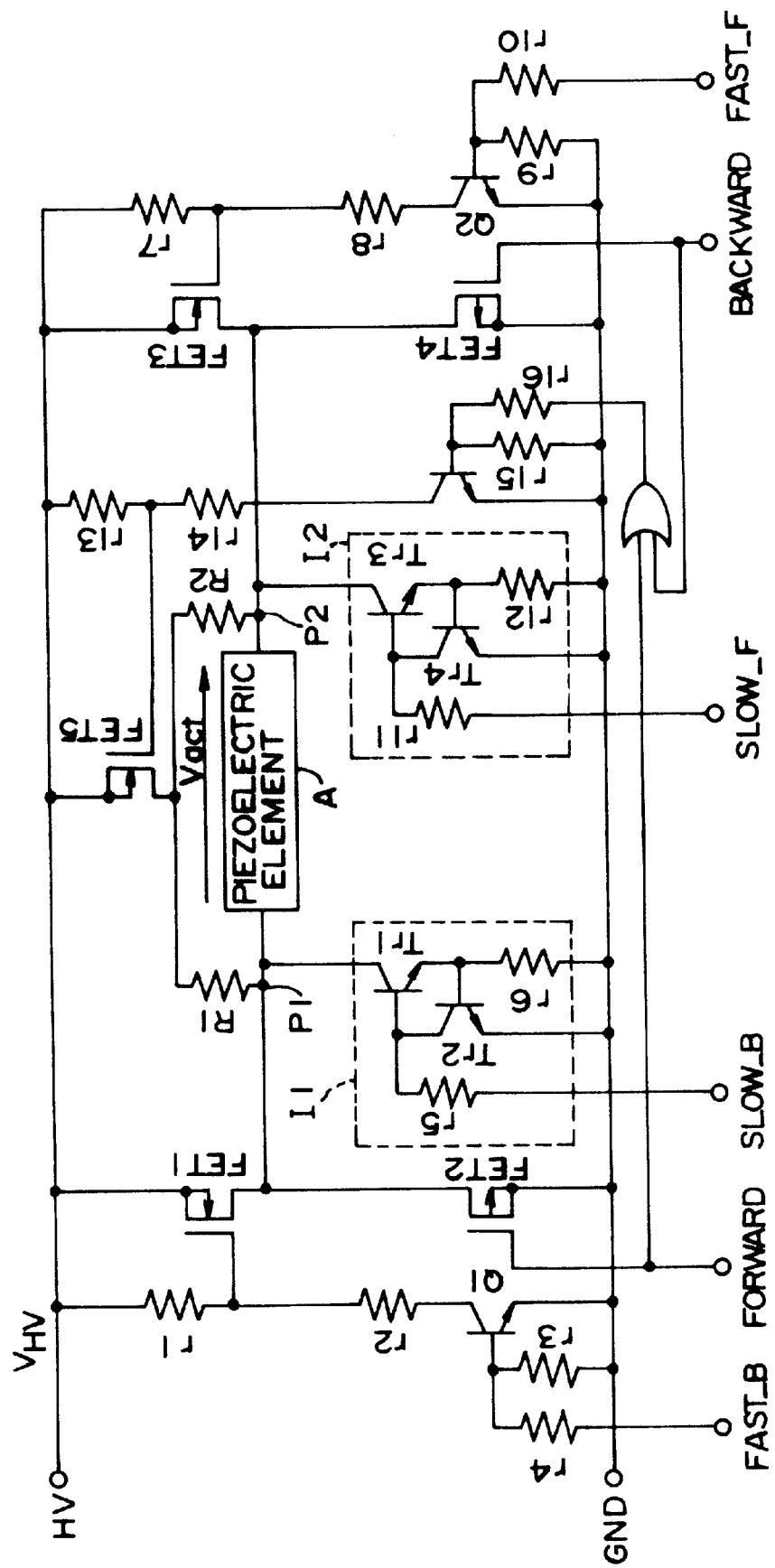
FIG. 8 is a circuit diagram of a driving circuit of a third embodiment of the invention.

As shown in the circuit diagram of FIG. 8, a driving circuit of the third embodiment comprises four switches respectively configured by the transistors FET1 to FET4, the two constant-current circuits I1 and I2, and the two resistors R1 and R2, and is configured in a substantially same manner as the first embodiment.

Unlike the first embodiment, the one terminal of each of the resistors R1 and R2 is not directly connected to HV terminal but connected to HV terminal via a switch configured by a transistor FET5. The transistor FET5 is turned on/off in accordance with an output of an OR circuit in which two inputs are respectively connected to FORWARD and BACKWARD terminals.

Next, the operation of the driving circuit in the case of the forward direction will be described as an example.

First, the H signal is supplied to FORWARD terminal to turn on the transistor FET2. At the same time, the output of the OR circuit becomes H and the transistor FET5 is turned on. As shown in FIG. 9(A), therefore, the piezoelectric element A is charged through the route of the transistor FET5, the resistor R2, the piezoelectric element, and the transistor FET2. At this time, since the resistor R2 is set to have a sufficiently large value, the piezoelectric element A is charged slow as shown in the timing chart of FIG. 10, so that the driving voltage Vact of the piezoelectric element A rises gently. During the charging process, therefore, no sound is generated.

Next, the H signal is supplied to SLOW_F terminal to turn on the constant-current circuit I2. At this time, as shown in FIG. 9(B), charges of the piezoelectric element A are removed slow through the constant-current circuit I2, and the driving voltage Vact rises gently as shown in FIG. 10. The transistor FET5 remains to be turned on. Since the resistor R2 is set to have a sufficiently large value, the circuit of FIG. 9(B) including the constant-current circuit I2 is not affected by the resistor.

The H signal is then supplied to FAST_F terminal to turn on the transistor FET3. At this time, as shown in FIG. 9(C), the piezoelectric element A is charged through the route of the transistor FET3, the piezoelectric element A, and the transistor FET2, so that the driving voltage Vact rises steeply as shown in FIG. 10. Since the resistor R2 is set to be sufficiently higher than the resistance of the transistor FET3, a large influence is not exerted. Thereafter, the H signal is alternatingly supplied to FAST_F and SLOW_F terminals.

When the driving operation is ended, the L signal is supplied to FORWARD terminal, whereby the transistors FET2 and FET5 are turned off. As shown in FIG. 9(D), a closed loop is formed by the resistors R1 and R2 and the piezoelectric element A. Therefore, charges remaining in the piezoelectric element A are dissipated through the closed loop, with the result that the driving voltage Vact falls gently as shown in FIG. 10.

When the direction is thereafter to be changed or the driving operation is to be again conducted, the same control as described above is repeated.

After the control of stopping the driving operation, charges of the piezoelectric element A are gently removed via the closed loop of the resistors R1 and R2. When the driving operation is to be conducted next time, therefore, the driving operation is always started with the charging process. The charging process is gently conducted by the constant-current circuits I1 and I2. In the start of the driving operation, the initial rise or fall of the driving voltage Vact of the piezoelectric element is gentle. Consequently, the generation of a sound during the driving operation can be prevented from occurring.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus having a driving device comprising:
   an electromechanical transducer for driving a member;
   a drive pulse generator for supplying and removing electrical charges to and from the electromechanical transducer via a first electrical circuit branch such that the electromechanical transducer is capable of expansion displacement and contraction displacement, with a rate of movement for expansion displacement being different from a rate of movement for contraction displacement whereby said driven member is moved in a predetermined direction; and
   a charger for supplying electrical charges to the electromechanical transducer via a second electrical circuit branch, wherein said charger operates before said drive pulse generator.

2. An apparatus according to claim 1, wherein the charger supplies electrical charges to the electromechanical transducer at a slower rate than the drive pulse generator.

3. An apparatus according to claim 1, wherein said apparatus is a taking lens of a camera and the driven member is a lens unit of the taking lens.

4. An apparatus having a driving device comprising:
   an electromechanical transducer for driving a member;
   a drive pulse generator for supplying and removing electrical charges to and from the electromechanical transducer via a first electrical circuit branch such that the electromechanical transducer is capable of expansion displacement and contraction displacement, with a rate of movement for expansion displacement being different from a rate of movement for contraction displacement whereby a driven member is moved in a predetermined direction; and
   a discharger for removing electrical charges from the electromechanical transducer via a second electrical circuit branch, wherein said discharger operates after said drive pulse generator has operated.

5. An apparatus according to claim 4, wherein the discharger removes electrical charges from the electromechanical transducer at a slower rate than the drive pulse generator.

6. An apparatus according to claim 4, wherein said apparatus is a taking lens of a camera and the driven member is a lens unit of the taking lens.

7. A driving device comprising:
   an electromechanical transducer;
   a drive pulse generator for supplying and removing electrical charges to and from the electromechanical transducer via a first electrical circuit branch such that the electromechanical transducer is capable of expansion displacement and contraction displacement, with a rate of movement for expansion displacement being different from a rate of movement for contraction displacement, whereby a driven member is moved in a predetermined direction; and a charger for supplying electrical charges to the electromechanical transducer via a second electrical circuit branch, wherein said charger operates before said drive pulse generator operates.

8. A driving device according to claim 7, wherein the charger supplies electrical charges to the electromechanical transducer at a slower rate than the drive pulse generator.

9. A driving device comprising:

an electromechanical transducer for driving a member;

a drive pulse generator for supplying and removing electrical charges to and from the electromechanical transducer via a first electrical circuit branch such that the electromechanical transducer is capable of expansion displacement and contraction displacement with a rate of movement for expansion displacement being different from a rate of movement for contraction displacement whereby a driven member is moved in a predetermined direction; and a discharger for removing electrical charges from the electromechanical transducer via a second electrical circuit branch wherein said discharger operates after operation of the drive pulse generator has ended.

10. A driving device according to claim 9, wherein the discharger removes electrical charges from the electromechanical transducer at a slower rate than the drive pulse generator.

11. A driving circuit comprising:

an electrical circuit configuration, wherein said electrical circuit configuration has a pulse generating circuit and a charging electrical circuit, and wherein said pulse generating circuit supplies and removes electrical charges to and from an electromechanical transducer via its pulse generating electrical circuit branch such that the electromechanical transducer is capable of expansion displacement and contraction displacement, with a rate of movement for expansion displacement being different from a rate of movement for contraction displacement whereby a driven member is moved in a predetermined direction, and wherein said charging electrical circuit supplies electrical charges to the electromechanical transducer via its charging electrical circuit branch.

12. A driving circuit according to claim 11, wherein said charging electrical circuit supplies electrical charges to the electromechanical transducer at a slower rate than the pulse generating circuit.

13. A driving circuit comprising:

an electrical circuit configuration, wherein said electrical circuit configuration has a pulse generating circuit and a discharging electrical circuit, and wherein said pulse generating circuit supplies and removes electrical charges to and from an electromechanical transducer via its pulse generating electrical circuit branch such that the electromechanical transducer is capable of expansion displacement and contraction displacement, with a rate of movement for expansion displacement being different from a rate of movement for contraction displacement whereby a driven member is moved in a predetermined direction, and wherein said discharging electrical circuit removes electrical charges from the electromechanical transducer via its discharging electrical circuit branch.

14. A driving circuit according to claim 13, wherein said discharging electrical circuit removes electrical charges from the electromechanical transducer at a slower rate than the pulse generating circuit.

* * * * *